June 5, 1956  B. P. NUNN  2,748,814
SHAPING AND TRIMMING MACHINE
Filed Dec. 11, 1953  4 Sheets-Sheet 3

Barney P. Nunn
  INVENTOR.

BY *Clarence A. O'Brien*
and *Harvey B. Jacobson*
  Attorneys

June 5, 1956  B. P. NUNN  2,748,814
SHAPING AND TRIMMING MACHINE
Filed Dec. 11, 1953  4 Sheets-Sheet 4
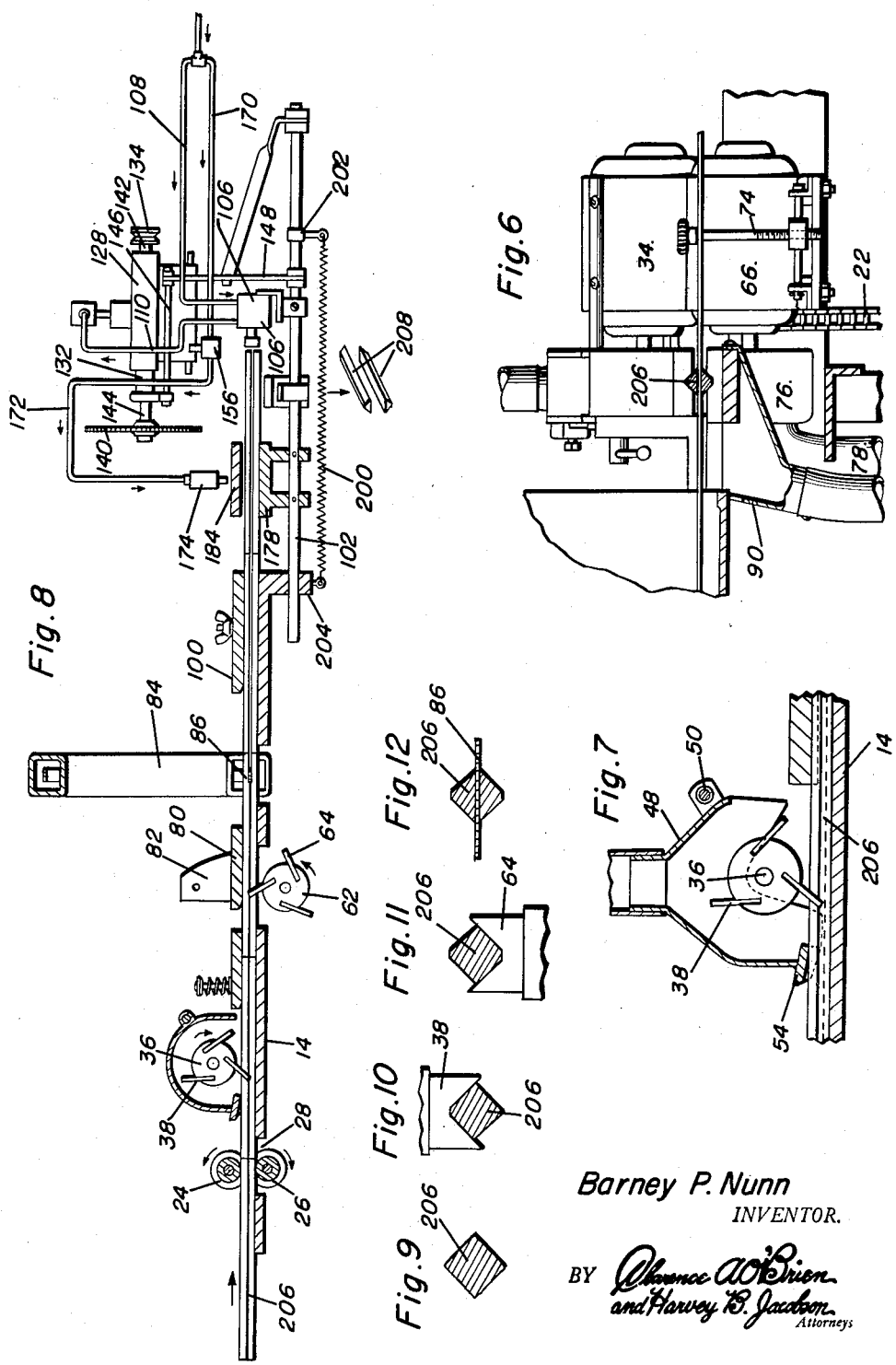
Barney P. Nunn
INVENTOR.

United States Patent Office 2,748,814
Patented June 5, 1956

2,748,814
SHAPING AND TRIMMING MACHINE
Barney P. Nunn, Marietta, Ga.

Application December 11, 1953, Serial No. 397,549

9 Claims. (Cl. 144—39)

This invention relates to the class of machine tools, and more particularly to a novel wood glue block shaping and trimming machine.

The primary object of the present invention resides in the provision of a machine for automatically cutting and shaping work pieces to form glue blocks of a desired size and length, thus enabling scrap lumber to be utilized for forming highly necessary elements for use in furniture construction and the like.

The construction of this invention features means for dressing rough material on all four sides while making chamfers on two opposite corners and then cutting the work pieces longitudinally. After the work pieces have been cut longitudinally, means are provided for cutting them to a selected size.

One of the novel features of the invention resides in the provision of an air button valve for use in actuating a saw for laterally cutting the work pieces, the saw further actuating another air button valve for clamping the work pieces in a specific position.

Another important feature of the construction of the invention resides in the provision of means for permitting the clamping means and the mandrel of the saw to travel with the work pieces so that the work pieces will be continuously fed.

Still further objects and features of this invention reside in the provision of a shaping and trimming machine that is strong and durable, simple in operation, easy to maintain, and which is fully automatic in operation, requiring only the feeding of scrap and the like in a continuous manner.

These, together with the various ancillary objects and features of the invention which will become apparent as the following description proceeds, are attained by this shaping and trimming machine, a preferred embodiment of which has been illustrated in the accompanying drawings, by way of example only, wherein:

Figure 6 is a vertical sectional view as taken along the plane of line 6—6 in Figure 2 and illustrating in particular the construction of the band saw and the means for removing sawdust and the like;

Figure 7 is a vertical sectional view as taken along the plane of line 7—7 in Figure 2, illustrating the construction of the upper shaping mechanism;

Figure 8 is a schematic diagram illustrating the various elements of the invention which perform operations on the work pieces so that the operation of the device can be more readily understood;

Figure 9 is a sectional detail view illustrating the shape of a work piece when inserted into the machine;

Figure 10 is a sectional detail view illustrating the manner in which the upper shaping member trims the work piece;

Figure 11 is a sectional detail view illustrating the manner in which the lower shaping blades engage and trim the work piece; and Figure 12 is a sectional view illustrating the band saw longitudinally dividing the work piece.

Figure 1:
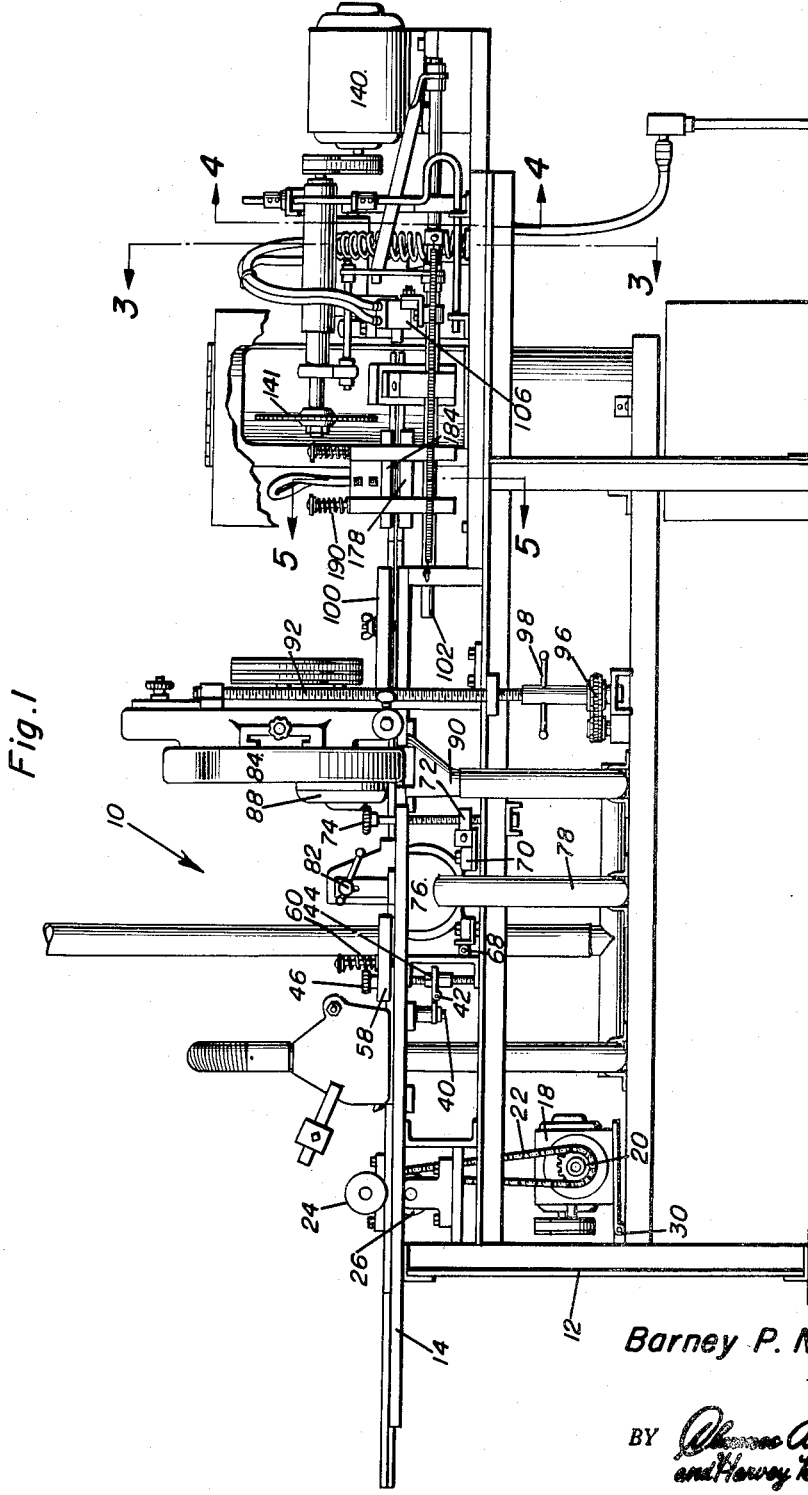
Figure 1 is a side elevational view of the shaping and trimming machine comprising the present invention.

With continuing reference to the accompanying drawings wherein like reference numerals designate similar parts throughout the various views, reference numeral 10 generally designates the shaping and trimming machine comprising the present invention which includes a framework 12 constructed of any suitable configuration and adapted to provide a suitable support for the other components of the invention. On the framework 12, there is mounted a tray or table 14 provided with a substantially V-shaped groove 16 therein for forming a guide for reception of the work pieces which are continuously fed into the shaping and trimming machine 10.

Mounted on the framework 12 is a motor 18 which drives a sprocket 20 for driving a chain 22 for driving the knurled feed rollers 24 and 26 mounted for engagement with the work piece and in alignment with an aperture 28 in the table 14. It is to be noted that the motor 18 is hingedly connected, as at 30, to the framework 12, thereby assuring that the feed roller 24 will be continuously weighted down into engagement with the work pieces.

Hingedly secured to the frame 12, as at 32, is a motor 34 adapted to drive a shaft 36 on which V-shaped cutter blades 38 are mounted, the blades 38 forming an upper cutter head. The motor 34 has attached thereto a plate 40 which is hingedly secured, as at 42, to another plate 44 which may be adjusted using the threaded adjusting means 46. A hood 48 is provided for the cutter blades 38 and is hingedly connected, as at 50, and provided with a counterweight 52 so as to continuously urge the hood to a lowered position. A tripper blade 54 is attached to the hood, as can be best seen in Figure 7.

Vacuum means 55 are provided for drawing out sawdust, chips and the like. This suction means may be connected to a trunk, as at 56, so as to remove all waste materials, thereby preventing the jamming of any of the parts of the machine.

A clamping member 58 is resiliently urged by spring 60 so as to continuously guidingly hold the work pieces in position so that they may be readily fed into the lower trimming head 62 having blades 64 mounted thereon of similar configuration as the blades 38. The cutting and shaping head 62 is driven by a motor 66 hingedly supported, as at 68, on the framework 12 and which has attached thereto, as at 70, a plate which is hinged to a member 72 which is capable of adjustment by the threaded member 74. A hood 76 is provided for the lower cutting head 62 and a conduit 78 is connected thereto.

A hold-down which is adjustable in its position by means of a clamp-type mechanism 82 is provided for maintaining the work pieces in engagement with the shaping blades 64.

Mounted on the frame 12 and of generally conventional construction is a band saw 84 having a blade 86 adapted to divide, as can be best seen in Figure 12, the work pieces into two separate halves after they have been shaped by the shaping blades 38 and 64. The band saw 84 is driven by a motor 88, and sawdust and chips resulting from the band saw operation are gathered in the conduit 90 which is connected to the trunk 56.

Means are provided for raising and lowering the band saw 84 which include a pair of threaded rods 92 and 94 which have sprockets mounted thereon interconnected by an endless chain 96 which can be best seen in Figure 1. An operating handle 98 is provided for rotating the shaft 92, and hence the shaft 94 so as to simultaneously rotate the shafts 92 and 94 to raise or lower the band saw 84 as desired.

A further clamping member 100 is provided for further clampingly guiding the work pieces.

Figure 2:
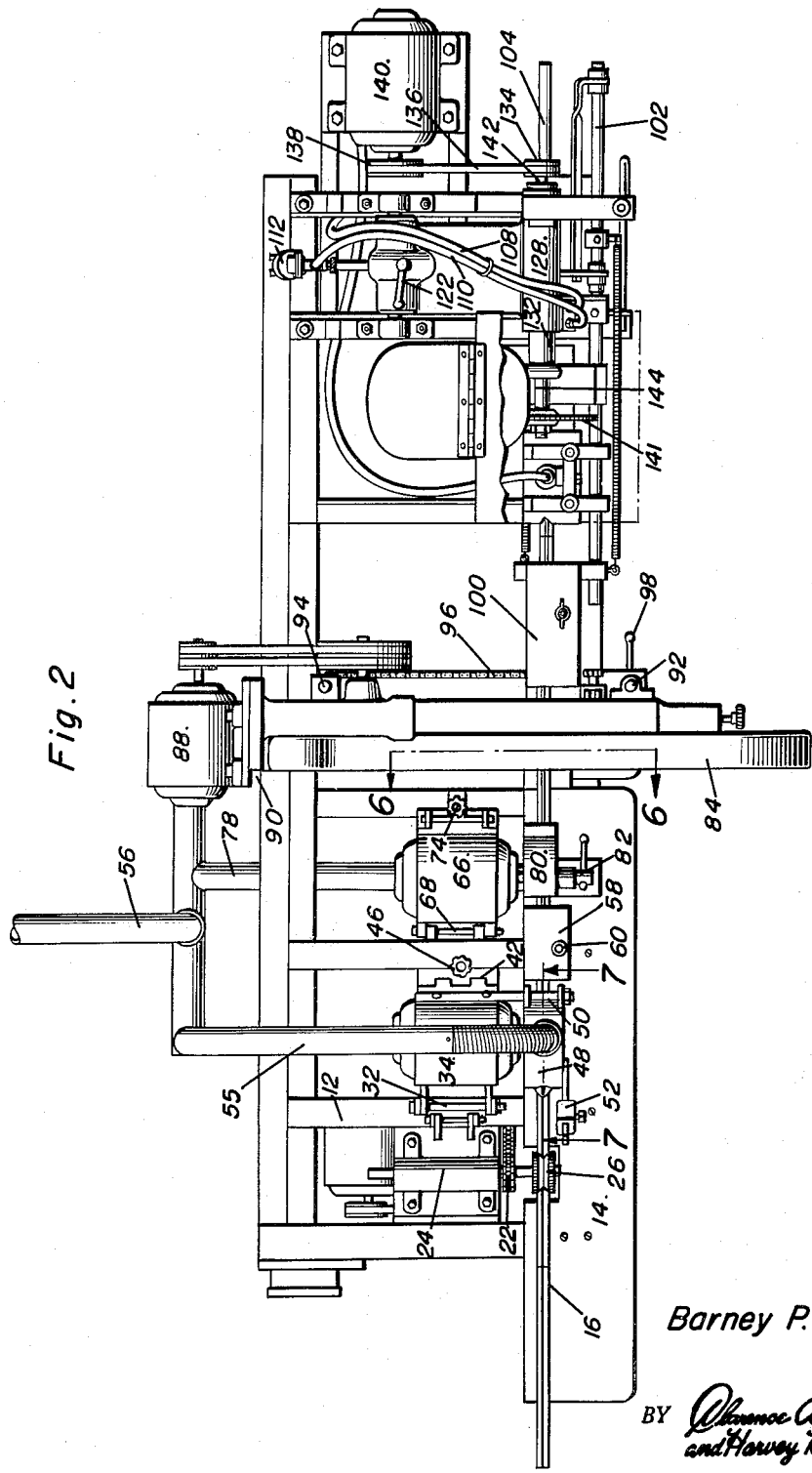
Figure 2 is a top plan view of the invention, with parts being broken away to show other parts with greater clarity.

A pair of shafts 102 and 104 are slidably mounted on the frame 12 and secured to the shaft 102 is an air button valve 106 which is adapted to be engaged and actuated by the work pieces as they are being continuously fed. Connected to the air button valve 106 is a pneumatic hose 108 connected to a source of compressed air. When the valve 106 is actuated, it permits air under pressure to pass through the flexible conduit 110 and into a cylinder 112 which can be best seen in Figures 2 and 3. The cylinder 112 has mounted therein a piston having a piston rod 114 extending outwardly therefrom, the piston rod 114 being rotatably attached, as at 116, to the frame 12.

Rotatably attached, as at 118, to the cylinder 112 is an arm 120 which is adjustably secured by means of a set screw 122 or other suitable fastener in a slot 124 formed in a mandrel housing 128 rotatably mounted on a supporting shaft 130. The mandrel housing 128 supports a mandrel 132 which is pivotally mounted and slidable therein. The mandrel 132 has a pulley 134 mounted thereon which is connected by means of an endless belt 136 to a drive pulley 138 driven by motor 140 carried by the frame 12. The mandrel 132 has a circular saw blade 141 mounted thereon. It is to be especially noted that the pulley 134 drives a shaft 142 splined with the mandrel 132, the mandrel 132 also including a driven shaft 144 which is capable of telescoping with the spline shaft 142. By means of a rod 146, the mandrel is connected to a member 148 affixed to the shaft 102. This arrangement can be seen in Figure 8 and is provided so that mandrel 132 will move with shaft 102.

It is necessary that the mandrel 132 move with the shaft 102 since the work pieces are continuously moving. Since the cutting operations require a noticeable period of time, the mandrel must move with the shaft in order for the saw blade 141 to remain in cutting relationship with the work piece.

Figure 3:
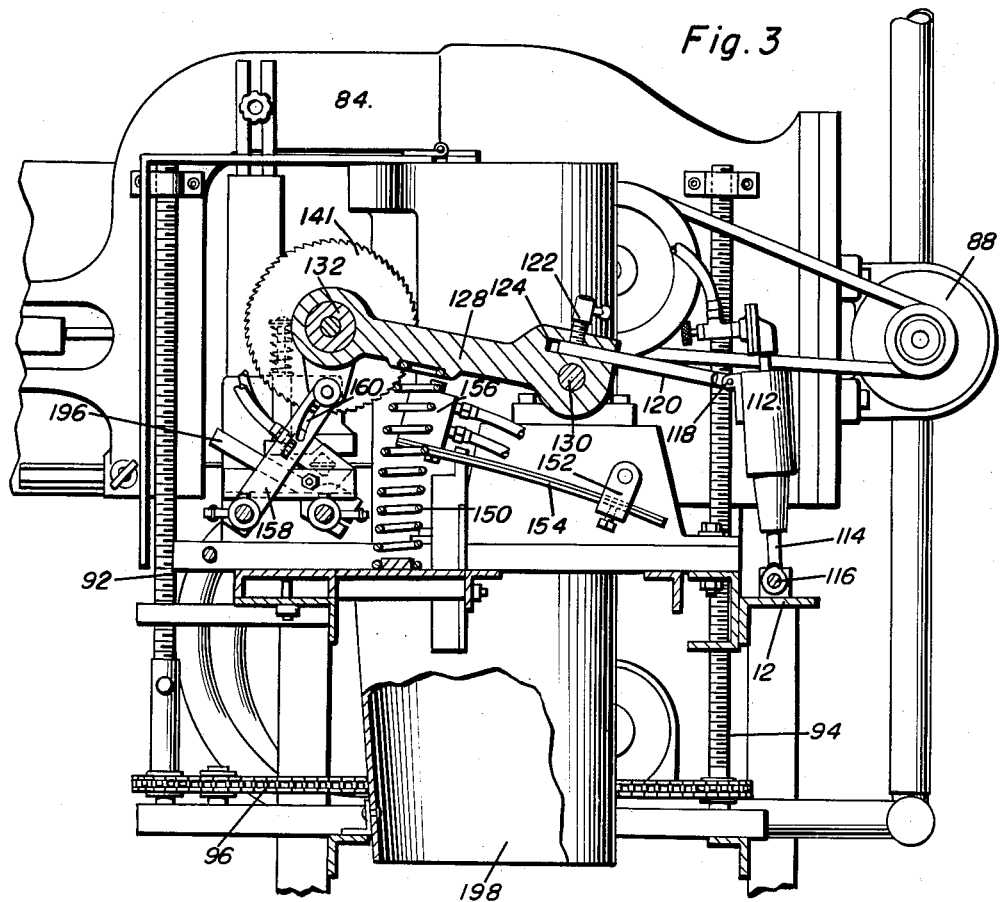
Figure 3 is an enlarged vertical sectional view as taken along the plane of line 3—3 in Figure 1 illustrating the construction of the means for mounting the mandrel and mandrel housing and for controlling movement of the saw for laterally cutting the work pieces.
Figure 4:
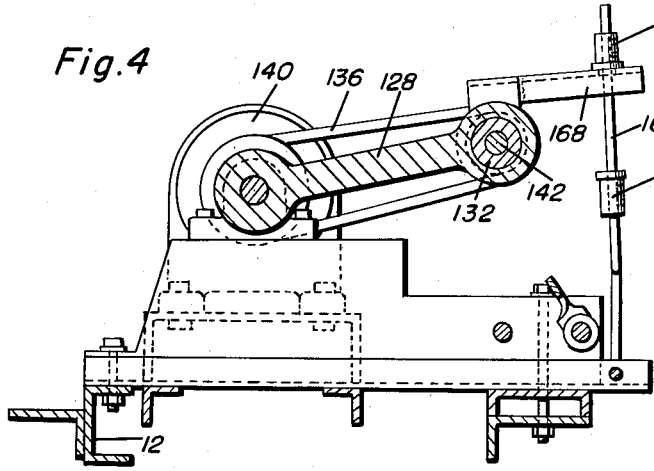
Figure 4 is an enlarged vertical sectional view as taken along the plane of line 4—4 in Figure 1 and illustrating in particular the limit stops controlling movement of the mandrel housing.

A coil spring 150 which can be seen best in Figure 3 is provided for resiliently urging the mandrel housing 128 to a raised position. By means of a bracket 152, a leaf spring 154 is adjustably mounted in alignment with the mandrel housing and carries a second push button valve 156 which is adapted to be actuated during an intermediate position as the mandrel housing 128 is being rotated downwardly when the cylinder 112 is actuated after the valve 106 has permitted air under pressure to enter the cylinder 112.

A link 158 having an arcuate slot 160 therein is provided for guiding the movement of the mandrel housing 128 and a rod 162 having upper and lower limit stops 164 and 166 mounted thereon is provided for engagement with an extension member 168 attached to the mandrel housing 128.

Figure 5:
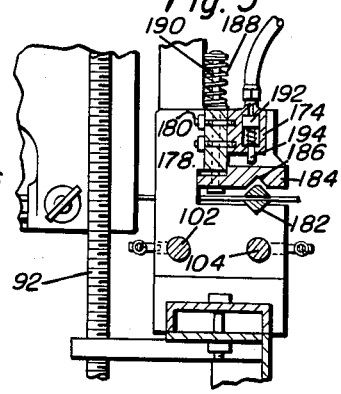
Figure 5 is a vertical sectional view as taken along the plane of line 5—5 in Figure 1 and illustrating in particular the pneumatically actuated clamping means.

Connected to the valve 156 which is actuated upon the downward movement of the mandrel housing 128 is a compressed air supply hose 170. The air valve 156 therefore controls the passage of air through the flexible hose 172 to a cylinder 174 mounted, as can best be seen in Figure 5, on a lower clamping member 178, as by fasteners 180, the lower clamping member 178 being adjustably carried by the shafts 102 and 104. The lower clamp member 178 has a V-shaped groove 182 therein. An upper clamping member 184 provided with a V-shaped groove 186 therein is resiliently urged into an upper position by means of a coil spring 188 coaxial with and mounted upon a rod 190 attached to the upper clamping member. Within the cylinder 174 is a piston 192 having a piston rod 194 connected thereto. The piston rod 194 is adapted to engage the upper clamping member 184 to urge the clamping member 184 into a closed and clamping position so as to lockingly engage the work piece between the upper and lower clamping members 178 and 184 respectively in the grooves 182 and 186. Then, since the clamping member 178 is suitably mounted on the shafts 102 and 104, the continuous feeding of the work pieces will cause the clamping member 178 and its associated parts to be moved along with the shafts 102 and 104, as is the switch 106, and the mandrel 132, together with the saw blade 141 until the saw blade 141 has completely cut through the upper and lower sections of the work pieces and they have been cammed off by the cam member 196 into a discharge chute 198 mounted below the saw 141 so that the coil spring 200 connected to a member 202 mounted on the shaft 102 and to an element 204 of the frame 12 can withdraw the shafts 102 and 104 to the initial positions.

The manner of operation of this glue block shaping and trimming machine is readily apparent from an inspection of Figure 8. It will be noted that the work pieces generally indicated by reference numeral 206 are introduced on the tray or table 14 between the knurled feed rollers 24 and 26, and are continuously fed beneath the upper cutting head 36 so that the blades 38 will shape and chamfer the upper portions of the work piece 206. The continuous feeding of the work pieces 206 will permit the blades 64 on the lower shaping head 62 to engage the lower portions of the work piece 206 to further shape the work piece, as is shown best in Figure 11. After the work pieces 206 have passed the lower shaping head 62, they will be divided by the band saw 86 and then will be continuously fed in their separated state through the clamping members 178 and 184 until the end of a work piece abuts against the valve 106 which will cause pneumatic operation of the mandrel 132 on which is mounted the saw blade 141 which is continuously driven by means of the motor 140. The lowering of the mandrel housing 128 will cause the air button valve 156 to permit flow of fluid through the flexible hose 172 to actuate the piston rod 194 to cause the upper clamping member 184 to be lowered into clamping engagement whereby the work piece will be held in locked arrangement so that upon further lowering of the mandrel housing 128, the saw blade 141 may laterally cut the work piece 206. Then, the work pieces, which are now in the shape of glue blocks, as at 208, will fall through the chute 198 after being cammed into the chute by the member 196.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A glue block shaping and trimming machine comprising a framework, at least one mounting shaft slidably supported by said framework, resilient means terminally connected to the framework and the shaft for urging the shaft to an initial position, a mandrel housing rotatably supported by said framework, a mandrel rotatable and slidable in said housing, drive means for rotating said mandrel operatively connected thereto, a saw blade mounted on said mandrel, a slide mounted on said shaft, a first valve on said slide, clamping means carried by said framework, pneumatic means operatively connected to said mandrel housing and said clamping means for tilting said mandrel housing when said first valve is engaged by a work piece, a second valve mounted in the path of said mandrel housing controlling the operation of said pneumatic means to actuate said clamping means after a partial movement of said mandrel housing.

2. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve mounted in the path of said mandrel housing controlling the operation of said pneumatic means to actuate said clamping means after a partial movement of said mandrel housing.

3. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve, a leaf spring carrying said second valve to position said second valve in the path of said mandrel housing whereby said second valve will be actuated by movement of said mandrel housing and will then be moved by said mandrel housing upon further movement of said mandrel housing, said second valve controlling the operation of said pneumatic means to actuate said clamping means after a partial movement of said mandrel housing.

4. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve mounted in the path of said mandrel housing controlling the operation of said pneumatic means to actuate said clamping means after a partial movement of said mandrel housing, said pneumatic means including a piston mounted in a cylinder, said piston being rotatably attached to said framework, and an arm adjustably attached to said mandrel housing, said arm being rotatably attached to said cylinder.

5. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve, a leaf spring carrying said second valve to position said second valve in the path of said mandrel housing whereby said second valve will be actuated by movement of said mandrel housing and will then be moved by said mandrel housing upon further movement of said mandrel housing, said second valve controlling the operation of said pneumatic means to actuate said clamping means after a partial movement of said mandrel housing, said pneumatic means including a piston mounted in a cylinder, said piston being rotatably attached to said framework, and an arm adjustably attached to said mandrel housing, said arm being rotatably attached to said cylinder.

6. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve mounted in the path of said mandrel housing controlling the operation of said pneumatic means to actuate said clamping means after a partial movement of said mandrel housing, said clamping means including a lower clamping member secured on said framework, an upper clamping member, resilient means urging said upper clamping member away from said lower clamping member, and an actuating piston engaging said upper clamping member for moving said upper clamping member into clamping relationship with said lower clamping member when said second valve is actuated.

7. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve, a leaf spring carrying said second valve to position said second valve in the path of said mandrel housing whereby said second valve will be actuated by movement of said mandrel housing and will then be moved by said mandrel housing upon further movement of said mandrel housing, said second valve controlling the operation of said pneumatic means to actuate said clamping means after a partial movement of said mandrel housing, said clamping means including a lower clamping member secured on said framework, an upper clamping member, resilient means urging said upper clamping member away from said lower clamping member, and an actuating piston engaging said upper clamping member for moving said upper clamping member into clamping relationship with said lower clamping member when said second valve is actuated.

8. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve mounted in the path of said mandrel housing controlling the operation of said pneumatic means to actuate said clamping means after a partial movement of said mandrel housing, said pneumatic means including a piston mounted in a cylinder, said piston being rotatably attached to said framework, an arm adjustably attached to said mandrel housing, said arm being rotatably attached to said cylinder, said clamping means including a lower clamping member secured on said framework, an upper clamping member, resilient means urging said upper clamping member away from said lower clamping member, and an actuating piston engaging said upper clamping member for moving said upper clamping member into clamping relationship with said lower clamping member when said second valve is actuated.

9. A glue block shaping and trimming machine comprising a framework, at least one mounting shaft slidably supported by said framework, resilient means terminally connected to the framework and the shaft for urging the mounting shaft to an initial position, a mandrel housing, a supporting shaft carried by said framework, said mandrel housing being rotatably mounted on said supporting shaft, means resiliently urging said mandrel housing to a raised position, a mandrel rotatable and slidable in said housing, drive means for rotating said mandrel operatively connected thereto, a saw blade mounted on said mandrel, a slide mounted on said mounting shaft, a first valve on said slide, clamping means carried by said framework, pneumatic means operatively connected to said mandrel housing and said clamping means for tilting said mandrel housing when said first valve is engaged by a work piece, a second valve, a leaf spring carrying said second valve to position said second valve in the path of said mandrel housing whereby said second valve will be actuated by movement of said mandrel housing and will then be moved by said mandrel housing upon further movement of said mandrel housing, said second valve controlling the operation of said pneumatic means to actuate said clamping means after a partial movement of said mandrel housing, said pneumatic means including a piston mounted in a cylinder, said piston being rotatably attached to said framework, an arm adjustably attached to said mandrel housing, said arm being rotatably attached to said cylinder, said clamping means including a lower clamping member secured on said framework, an upper clamping member, resilient means urging said upper clamping member away from said lower clamping member, and an actuating piston engaging said upper clamping member for moving said upper clamping member into clamping relationship with said lower clamping member when said second valve is actuated.

References Cited in the file of this patent
UNITED STATES PATENTS

| | | |
|---|---|---|
| 914,746 | McWilliams | Mar. 9, 1909 |
| 1,449,008 | Fetzer | June 24, 1924 |
| 2,302,961 | Kramer | Nov. 24, 1942 |
| 2,652,864 | De Anguera | Sept. 22, 1953 |